(12) United States Patent

Dasari et al.

(10) Patent No.:     US 12,689,564 B2

(45) Date of Patent:          Jul. 21, 2026

(54) APPARATUS AND METHOD FOR NETWORK AND COMPUTING RESOURCE MANAGEMENT FOR SERVICE-ORIENTED COMMUNICATION IN A SOFTWARE-DEFINED NETWORK ARCHITECTURE

(71) Applicant: Robert Bosch GmbH, Stuttgart (DE)

(72) Inventors: Dakshina Narahari Dasari, Renningen (DE); Dennis Grewe, Renningen (DE); Naresh Ganesh Nayak, Leonberg (DE); Sebastian Schildt, Weissach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 73 days.

(21) Appl. No.: 18/712,076

(22) PCT Filed: Jan. 26, 2023

(86) PCT No.: PCT/EP2023/051919

§ 371 (c)(1),
(2) Date: May 21, 2024

(87) PCT Pub. No.: WO2023/160938

PCT Pub. Date: Aug. 31, 2023

(65) Prior Publication Data

US 2025/0016066 A1     Jan. 9, 2025

(30) Foreign Application Priority Data

Feb. 22, 2022     (DE) ..................... 10 2022 201 850.8

(51) Int. Cl.
H04L 12/24          (2006.01)
H04L 41/40          (2022.01)
(Continued)

(52) U.S. Cl.
CPC .............. *H04L 41/40* (2022.05); *H04L 43/20* (2022.05)

(58) Field of Classification Search
CPC ......... H04L 41/40; H04L 43/20; H04L 12/24; H04L 41/082; H04L 41/122; G06F 8/35; G06F 8/41; H04N 1/173
(Continued)

(56) References Cited

U.S. PATENT DOCUMENTS 10,372,475 B2 *   8/2019  Klompje ............. G06F 9/45558
10,567,288 B1     2/2020  Mutnuru
(Continued)

FOREIGN PATENT DOCUMENTS

JP       2018504038 A      2/2018
WO       2020183954 A1     9/2020

OTHER PUBLICATIONS

International Search Report for PCT/EP2023/051919, Issued Apr. 21, 2023.
(Continued)

*Primary Examiner* — Jude Jean Gilles

(74) *Attorney, Agent, or Firm* — NORTON ROSE FULBRIGHT US LLP

(57)          ABSTRACT

An apparatus and a method for network and computing resource management for service-oriented communication in a software-defined network architecture (SDN). An SDN controller monitors network traffic in a communication network. The SDN controller receives data about a computing resource usage and about a service-oriented communication in the communication network. The SDN controller determines a network and computing resource configuration depending on a result of an evaluation of the data. The SDN controller configures the network and computing resources depending on the network and computing resource configuration.

10 Claims, 2 Drawing Sheets

(51) Int. Cl.
  *H04L 43/20*    (2022.01)
  *G06F 8/35*    (2018.01)
  *G06F 8/41*    (2018.01)

(58) Field of Classification Search
  USPC ........................................................ 709/220
  See application file for complete search history.

(56)                    References Cited

U.S. PATENT DOCUMENTS

| 10,705,808 | B2 * | 7/2020 | Chiosi ........................ G06F 8/35 |
| 2015/0200838 | A1 * | 7/2015 | Nadeau ................... H04L 45/50 |
| | | | 370/254 |
| 2016/0150421 | A1 | 5/2016 | Li et al. |
| 2021/0184926 | A1 | 6/2021 | Saito et al. |

OTHER PUBLICATIONS

Alsaeedi et al., "Toward Adaptive and Scalable Openflow-SDN Flow Control: A Survey," IEEE Access, vol. 7, 2019, pp. 107346-107379. <https://sci-hub.ru/10.1109/access.2019.2932422> Downloaded Mar. 25, 2024.

Binsahaq et al., "A Survey on Autonomic Provisioning and Management of QOS in SDN Networks," IEEE Access, vol. 7, 2019, pp. 73384-73435. <https://sci-hub.ru/10.1109/access.2019.2919957> Downloaded Mar. 25, 2024.

* cited by examiner

SDN controller monitors network traffic

202

SDN controller determines the network and computing resource configuration

204 network and computing resources are configured by SDN controller

206

APPARATUS AND METHOD FOR NETWORK AND COMPUTING RESOURCE MANAGEMENT FOR SERVICE-ORIENTED COMMUNICATION IN A SOFTWARE-DEFINED NETWORK ARCHITECTURE

FIELD

The present invention relates to an apparatus and a method for network and computing resource management for service-oriented communication in a software-defined network architecture.

SUMMARY

A method according to the present invention for network and computing resource management for service-oriented communication in a software-defined network architecture, SDN, provides that an SDN controller monitors network traffic in a communication network, wherein the SDN controller receives data about a computing resource usage and about a service-oriented communication in the communication network, wherein the SDN controller determines a network and computing resource configuration depending on a result of an evaluation of the data, and the SDN controller configures the network and computing resources depending on the network and computing resource configuration. Service-oriented communication enables the services that need to communicate with one another to be found automatically in the communication network 100. The network and computing resource management of the SDN controller adapts the communication network to the requirements of the services.

According to an example embodiment of the present invention, an assignment of instances of services to control devices and paths for messages that the instances exchange with one another, which characterize the network and computing resource configuration, is preferably determined depending on the result of the evaluation of the data. This prevents bottlenecks on data lines and overloaded control devices in the communication network.

If, as a result of the evaluation of the data, a bottleneck is detected on a data line of the communication network to which a network switch of the communication network forwards messages, for example, this network switch is configured via the network configuration to not forward these messages to the data line.

If, as a result of the evaluation of the data, an overloaded control device is identified on which an instance of a service is running, for example, the instance is configured via the resource configuration to not send an offer for the service or leave an incoming request for the service unanswered.

If, as a result of the evaluation of the data, an overloaded control device is identified on which an instance of a service is running, for example, at least one network switch is configured via the network configuration to not forward an offer for the service from this instance.

According to an example embodiment of the present invention, an apparatus for network and computing resource management for service-oriented communication in a software-defined network architecture, SDN, provides that an SDN controller is configured to monitor network traffic in a communication network, wherein the SDN controller is configured to receive data about a computing resource usage and about a service-oriented communication in the communication network, wherein the SDN controller is configured to determine a network and computing resource configuration depending on a result of an evaluation of the data, and wherein the SDN controller is configured to configure the network and computing resources depending on the network and computing resource configuration. This apparatus enables the communication network to adapt to the requirements of the services.

According to an example embodiment of the present invention, the SDN controller is preferably configured to determine an assignment of instances of services to control devices and paths for messages that the instances exchange with one another, which characterize the network and computing resource configuration, depending on the result of the evaluation of the data.

If, as a result of the evaluation of the data, a bottleneck is detected on a data line of the communication network to which a network switch of the communication network forwards messages, for example, the SDN controller is configured to configure this network switch via the network configuration to not forward these messages to the data line.

If, as a result of the evaluation of the data, an overloaded control device is identified on which an instance of a service is running, for example, the SDN controller is configured to configure the instance via the resource configuration to not send an offer for the service or leave an incoming request for the service unanswered.

If, as a result of the evaluation of the data, an overloaded control device is identified on which an instance of a service is running, for example, the SDN controller is configured to configure at least one network switch via the network configuration to not forward an offer for the service from this instance.

In one example embodiment of the present invention, the communication network comprises control devices, at least one network switch and/or at least one gateway of a vehicle and an industrial system or an Internet of Things system, wherein the SDN controller is configured to install, update, activate or deactivate instances of services on control devices in accordance with the network and/or computing resource configuration and/or wherein the SDN controller is configured to configure at least one network switch and/or at least one gateway to forward or not forward messages from and/or to services or their instances in accordance with the network and/or computing resource configuration.

A computer program can be provided, wherein the computer program comprises computer-readable instructions that, when executed by a computer, cause the method according to the present invention to run.

Further advantageous embodiments of the present invention will become apparent from the following description and the figures.

DETAILED DESCRIPTION OF EXAMPLE EMBODIMENTS

Figure 1:
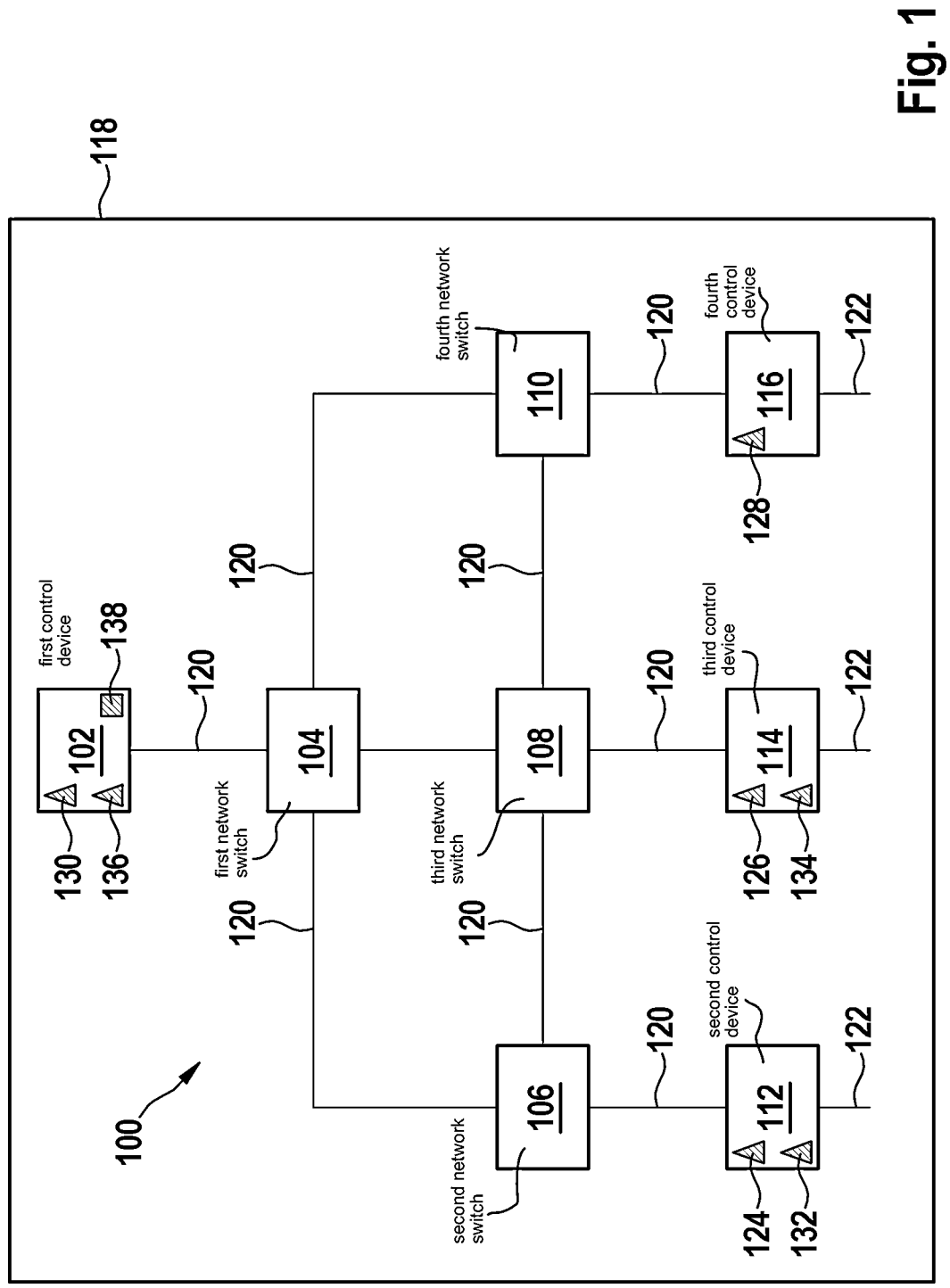
FIG. 1 schematically, a portion of a communication network with a software-defined network architecture, according to an example embodiment of the present invention.

FIG. 1 schematically shows a portion of a communication network 100.

The communication network 100 is a software-defined communication network (SDN) with a software-defined network architecture (SDN architecture). A controller of the communication network 100 is decoupled from functions for forwarding messages in the communication network 100. The controller can be programmed independently of the forwarding functions.

The communication network 100 comprises a service-oriented architecture. The underlying infrastructure of the communication network 100, i.e. hardware of the communication network 100, is abstracted from services, i.e. software, which run in the communication network 100. An instance of a service runs on a suitable device of the infrastructure. An instance is a source or a destination of a message. A message from a source is forwarded to its destination via a path in the infrastructure defined by the SDN architecture.

In the example, the communication network 100 comprises a first control device 102, which is connected to a second network switch 106 via a first network switch 104. The second network switch 106 is connected to a third network switch 108 and a fourth network switch 110. The second network switch 106 is connected to a second control device 112. The third network switch 108 is connected to a third control device 114. The fourth network switch 110 is connected to a fourth control device 116.

In the example, the control devices and network switches are disposed in a vehicle 118.

In a first portion of the communication network 100, the communication network 100 comprises data lines 120 of a first network type. The control devices and network switches are configured to communicate via the data lines 120 according to a first protocol of the first network type. In the example, the first network type is a technology for wired data networks that connects software and/or hardware to one another. In the example, the data lines 120 are LAN cables and the protocol is Ethernet. Ethernet enables data exchange between the control devices as terminal devices.

A respective data line 120, i.e. a LAN cable, connects the second control device 112 physically to the second network switch 106, the third control device 114 physically to the third network switch 108 and the fourth control device 116 physically to the fourth network switch 110. In the example, no physical data line to one of the respective other control devices or network switches is provided for the second control device 112 nor the third control device 114 nor the fourth control device 116.

A respective data line 120 is provided between the second network switch 106 and the third network switch 108 and also between the third network switch 108 and the fourth network switch 110. A respective data line 120 is provided between the second network switch 106 and the first network switch 102, between the third network switch 108 and the first network switch 102 as well as between the fourth network switch 110 and the first network switch 102.

In the example, no active network device is provided in any of the data lines 120.

The second control device 112, the third control device 114, and the fourth control device 116 are connected to a second portion of communication network 100. The second control device 112, the third control device 114 and the fourth control device 116 are configured to communicate via lines 122 of a second network type in accordance with a second protocol of the second network type. In the example, the second network type is a technology for wired data networks that connects software and/or hardware to one another. In the example, the lines 122 are twisted pairs of cables and the protocol is the Controller Area Network protocol. The Controller Area Network protocol allows data exchange between these control devices as terminal devices according to a predetermined schema. In the example, the lines 122 do not include any active network devices.

In the example, the first control device 102 is not connected to the second portion of the network via one of the lines 122.

In the example, a first instance 124 of a first service is offered by the second control device 112. In the example, a second instance 126 of the first service is offered by the third control device 114. In the example, a first instance 128 of a second service is offered by the fourth control device 116. In the example, a second instance 130 of the second service is offered by the first control device 102. In the example, a single instance 132 of a third service is offered by the second control device 112 in the communication network 100. In the example, a single instance 134 of a fourth service is offered by the first control device 102 in the communication network 100. In the example, a single instance 136 of a fifth service is offered by the third control device 114 in the communication network 100.

In the example, a SDN controller 138 configured to control the SDN is provided on the first control device 102. The SDN controller 138 is in particular implemented in a logically centralized, software-based manner.

In the example, the SDN controller 138 is configured to transmit the instances of the services to a respective one of the control devices on which the service is to be executed. In the example, the SDN controller 138 is configured to activate the instance on the control device or the control devices on which the service is to be executed. In the example, the SDN controller 138 is configured to deactivate the instance on the control device or the control devices on which the service should not be executed.

In the example, a service that requires another service for its function is configured to locate said other service in the communication network 100. The service is configured to search for a request for this other service via the communication network 100, for instance. In the example, an instance of that service is configured to locate an instance of the other service. The service or the instance is configured to send the request to the communication network 100 in particular as a broadcast. In the example, a service that offers its function to other services is configured to offer itself via the communication network 100. The service is designed to offer its service via the communication network 100, for instance. In the example, the service or an instance of this service is configured to send the offer to the communication network 100 in particular as a broadcast.

A data stream between a source and a destination, i.e. messages sent from one instance to another instance, are forwarded in the communication network 100. If too many data streams pass over the same data line 120 or network switch at the same time, a bottleneck can occur. If too many instances of different services are used on one of the control devices, this control device can become overloaded.

The following procedure prevents the occurrence of a bottleneck and/or the overloading of a control device. In the method, network and computing resource management is carried out by the SDN controller 138.

In the example, the SDN controller 138 is configured to monitor network traffic in the communication network 100. In the example, the SDN controller 138 is configured to receive offers and/or requests that occur in the network traffic.

In the example, the SDN controller 138 is configured to evaluate received offers and/or requests. In the example, the SDN controller 138 is configured to detect an existing or possible bottleneck on a data line 120. In the example, the SDN controller 138 is configured to deactivate forwarding of messages from data streams via the data line 120 if this would overload it.

In the example, the SDN controller 138 is configured to identify whether a control device is overloaded or would be overloaded by activating an instance. In the example, the SDN controller 138 is configured to control the use of the instances and/or the assignment of the instances to the control devices in the communication network 100 in such a way that overloading of the control device is prevented.

Figure 2:
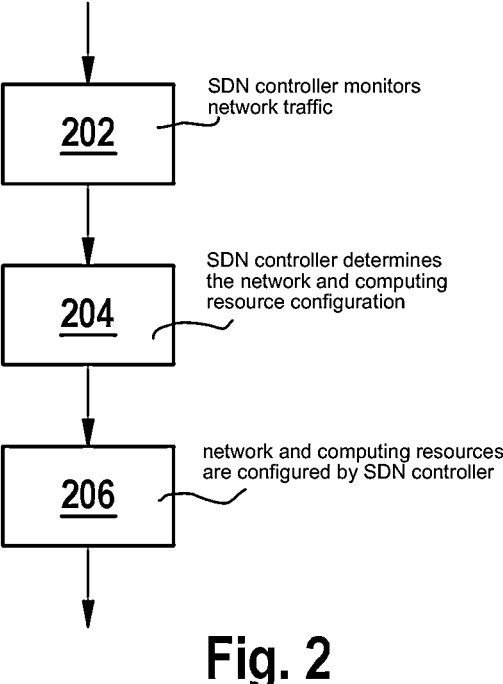
FIG. 2 shows steps in a method for network and computing resource management for service-oriented communication in a software-defined network architecture, according to an example embodiment of the present invention.

The procedure is described using the example of the method shown schematically in FIG. 2.

In a step 202, the SDN controller 138 monitors the network traffic in the communication network 100, wherein the SDN controller 138 receives data about a computing resource usage and about a service-oriented communication in the communication network 100.

In the example, the SDN controller 138 monitors network traffic and collects data that includes, for example:

Knowledge about available instances of services and the assignment thereof to the control devices. These data are available as part of the offers and/or requests that occur in the network traffic, for instance. Messages according to the Scalable Service-Oriented Middleware over Internet Protocol (SOME/IP) protocol or Data Distribution Service (DDS) are provided as offers or requests, for example.

Requirements for the communication network 100 and computing resources. This information can be derived from a description of a service, for instance. The description includes information relating to a quality of the service, for example. The description is contained in the offer and/or in the request, for example, in particular in accordance with SOME/IP or DDS.

Network topology. The network topology is ascertained via a separate protocol, for example, for instance the Link Layer Discovery Protocol (LLDP).

Computing resource availability at the control devices. This information is known through an internal scheduling model, for example, or is communicated by the control devices, in particular regularly or irregularly, or in response to a request from the SDN controller 138. It can be provided that the communication of this information by the control device is triggered by an event. The event is a temporary unavailability of an instance of the service on the control device, for example.

In a step 204, the SDN controller 138 determines the network and computing resource configuration depending on a result of an evaluation of the data.

In the example, the SDN controller 138 determines an assignment of instances of services to control devices and paths for messages that the instances exchange with one another, i.e. the paths for the respective data streams.

In the example, the assignment is determined depending on the computing resource availability of the control devices in such a way that no control device that offers a service is overloaded.

In the example, the assignment is determined depending on at least one network resource of the communication network 100 in such a way that no bottleneck occurs on the data lines 120 or network switches in the communication network 100.

To do this, an optimization problem is formulated and solved, for instance. The optimization problem can be formulated as a constraint satisfaction problem (CSP) or heuristically.

In the example, the solution to the optimization problem is the assignment of instances to control devices and/or paths to pairs of instances.

In a step 206, the network and computing resources are configured by the SDN controller 138 depending on the network and computing resource configuration.

In the example, the SDN controller 138 implements a result of an evaluation of the data, in particular the solution to the optimization problem, in the communication network 100.

In the example, the SDN controller 138 sends instructions that cause the following to occur:

The SDN controller 138 programs look-up tables in the network switches to route messages between the pairs of instances over the designated paths.

The SDN controller 138 configures instances that are intended to communicate with one another. In one example a protocol is provided for this purpose, with which the SDN controller 138 informs an instance whether it should be active or deactivated. In another example, an addition to the SOME/IP or DDS is provided for this purpose, by means of which the SDN controller 138 instructs an instance to either not send an offer or not respond to a request. In the example, the SDN controller 138 instructs the instance to not send an offer or not respond to a request running on the otherwise overloaded control device.

If a service has two instances, the SDN controller 138 instructs the network switches to discard a broadcast with which the service is being offered by one of the instances. In the example, the SDN controller 138 instructs the network switches to discard the broadcast from the instance that is running on the otherwise overloaded control device.

For example, if there is a bottleneck between the second network switch 106 and the third network switch 108, the network switches are configured at the first instance 124 of the first service on the second control device 112 and the second instance 126 of the first service on the third control device 114 to discard the broadcast with the offer of the first service from the second instance 126 of the first service, i.e. from the third control device 114. Discarding in this context means that the broadcast, if it is received at a network switch, is not forwarded by that network switch. The same procedure is followed for the second service, for instance, if it is recognized that its data stream would create a bottleneck.

If there is an overload of one of the control devices on which one of multiple instances of a service is being offered, for example, the SDN controller 138 instructs the network switches to discard a broadcast with which the service is being offered by the instance that is running on the overloaded control device.

If the second control device 112 is overloaded, for example, the network switches are configured at the first instance 124 of the first service on the second control device 112 and the second instance 126 of the first service on the third control device 114 to discard the broadcast with the offer of the first service from the first instance 124 of the first service, i.e. from the second control device 112. Discarding in this context means that the broadcast, if it is received at a network switch, is not forwarded by that network switch.

The method and the apparatus can be used in vehicle architectures, in particular their gateways or switches, control devices, vehicle computers and systems at an edge of the communication network 100. The method and apparatus can be used in industrial systems or Internet of Things systems, in particular their gateways or switches.

The invention claimed is:

1. A method for network and computing resource management for service-oriented communication in a software-defined network architecture (SDN), the method comprising the following steps:

monitoring, by an SDN controller, network traffic in a communication network, wherein the SDN controller receives data about a computing resource usage and about a service-oriented communication in the communication network;

determining, by the SDN controller, a network and computing resource configuration depending on a result of an evaluation of the data; and configuring, by the SDN controller, the network and computing resources depending on the network and computing resource configuration;

wherein an assignment of instances of services to control devices and paths for messages that the instances exchange with one another, which characterize the network and computing resource configuration, is determined depending on the result of the evaluation of the data.

2. The method according to claim 1, wherein, when, as a result of the evaluation of the data, a bottleneck is detected on a data line of the communication network to which a network switch of the communication network forwards messages, the network switch is configured via the network configuration to not forward these messages to the data line.

3. The method according to claim 1, wherein, when, as a result of the evaluation of the data, an overloaded control device is identified on which an instance of a service is running, the instance is configured via the resource configuration to not send an offer for the service or leave an incoming request for the service unanswered.

4. The method according to claim 1, wherein, when, as a result of the evaluation of the data, an overloaded control device is identified on which an instance of a service is running, at least one network switch is configured via the network configuration to not forward an offer for the service from the instance.

5. An apparatus for network and computing resource management for service-oriented communication in a software-defined network architecture (SDN), comprising:

an SDN controller configured to monitor network traffic in a communication network, wherein the SDN controller is configured to receive data about a computing resource usage and about a service-oriented communication in the communication network, wherein the SDN controller is configured to determine a network and computing resource configuration depending on a result of an evaluation of the data, and wherein the SDN controller is configured to configure the network and computing resources depending on the network and computing resource configuration;

wherein the SDN controller is configured to determine an assignment of instances of services to control devices and paths for messages that the instances exchange with one another, which characterize the network and computing resource configuration, depending on the result of the evaluation of the data.

6. The apparatus according to claim 5, wherein, if, as a result of the evaluation of the data, a bottleneck is detected on a data line of the communication network to which a network switch of the communication network forwards messages, the SDN controller is configured to configure this network switch via the network configuration to not forward these messages to the data line.

7. The apparatus according to claim 5, wherein, if, as a result of the evaluation of the data, an overloaded control device is identified on which an instance of a service is running, the SDN controller is configured to configure the instance via the resource configuration to not send an offer for the service or leave an incoming request for the service unanswered.

8. The apparatus according to claim 5, wherein, if, as a result of the evaluation of the data, an overloaded control device is identified on which an instance of a service is running, the SDN controller is configured to configure at least one network switch via the network configuration to not forward an offer for the service from this instance.

9. An apparatus for network and computing resource management for service-oriented communication in a software-defined network architecture (SDN), comprising:

an SDN controller configured to monitor network traffic in a communication network, wherein the SDN controller is configured to receive data about a computing resource usage and about a service-oriented communication in the communication network, wherein the SDN controller is configured to determine a network and computing resource configuration depending on a result of an evaluation of the data, and wherein the SDN controller is configured to configure the network and computing resources depending on the network and computing resource configuration;

wherein the communication network includes: (i) control devices, and (ii) at least one network switch and/or at least one gateway, of a vehicle or an industrial system or an Internet of Things system, wherein: (i) the SDN controller is configured to activate or deactivate instances of services on the control devices in accordance with the network and/or computing resource configuration and/or (ii) the SDN controller is configured to configure at least one network switch and/or at least one gateway to forward or not forward messages from and/or to services or their instances in accordance with the network and/or computing resource configuration.

10. A non-transitory computer-readable medium on which is stored a computer program including computer-readable instructions for network and computing resource management for service-oriented communication in a software-defined network architecture (SDN), the instructions, when executed by a computer, causing the computer to perform the following steps:

monitoring, by an SDN controller, network traffic in a communication network, wherein the SDN controller receives data about a computing resource usage and about a service-oriented communication in the communication network;

determining, by the SDN controller, a network and computing resource configuration depending on a result of an evaluation of the data; and configuring, by the SDN controller, the network and computing resources depending on the network and computing resource configuration;

wherein an assignment of instances of services to control devices and paths for messages that the instances exchange with one another, which characterize the network and computing resource configuration, is determined depending on the result of the evaluation of the data.

* * * * *